(12) United States Patent
Smith

(10) Patent No.: US 10,060,533 B2
(45) Date of Patent: Aug. 28, 2018

(54) TIERED BRUSH SEAL

(71) Applicant: United Technologies Corporation, Farmington, CT (US)

(72) Inventor: Darren M. Smith, Andover, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/972,363

(22) Filed: Dec. 17, 2015

(65) Prior Publication Data

US 2016/0178063 A1 Jun. 23, 2016

Related U.S. Application Data

(60) Provisional application No. 62/093,274, filed on Dec. 17, 2014.

(51) Int. Cl.
| | |
|---|---|
| *F01D 11/02* | (2006.01) |
| *F16J 15/3288* | (2016.01) |
| *F16J 15/3252* | (2016.01) |
| *F01D 11/00* | (2006.01) |

(52) U.S. Cl.
CPC .......... *F16J 15/3288* (2013.01); *F01D 11/00* (2013.01); *F16J 15/3252* (2013.01); *F05D 2240/56* (2013.01); *F05D 2250/75* (2013.01)

(58) Field of Classification Search
CPC .... F16J 15/3288; F16J 15/3252; F01D 11/00; F05D 2220/32; F05D 2240/56

USPC .......................................................... 277/355
See application file for complete search history.

(56) References Cited

U.S. PATENT DOCUMENTS

| | | | | |
|---|---|---|---|---|
| 5,941,685 | A * | 8/1999 | Bagepalli | F01D 5/225 277/355 |
| 7,048,497 | B2 * | 5/2006 | Arilla | F01D 5/081 415/116 |
| 7,121,791 | B2 * | 10/2006 | Friedl | F01D 11/00 415/115 |
| 2010/0067839 | A1 * | 3/2010 | Fischer | B60C 23/003 384/544 |
| 2011/0072831 | A1 * | 3/2011 | Tanimura | F01D 11/001 60/805 |
| 2013/0004290 | A1 * | 1/2013 | Krishnan | F01D 11/127 415/1 |

\* cited by examiner

*Primary Examiner* — Nathan Cumar
(74) *Attorney, Agent, or Firm* — Cantor Colburn LLP

(57) ABSTRACT

The present disclosure relates to sealing systems for gas turbine engines. In one embodiment, a seal support structure for a gas turbine engine includes a seal support configured to retain a circumferential seal and an engine support configured for mounting the seal support structure to a gas turbine engine mount. The engine support includes at least one channel configured to provide radial movement of the seal support structure and circumferential retention of the seal support. Another embodiment is directed to a sealing system including a circumferential seal and seal support structure configured to provide radial movement.

17 Claims, 3 Drawing Sheets

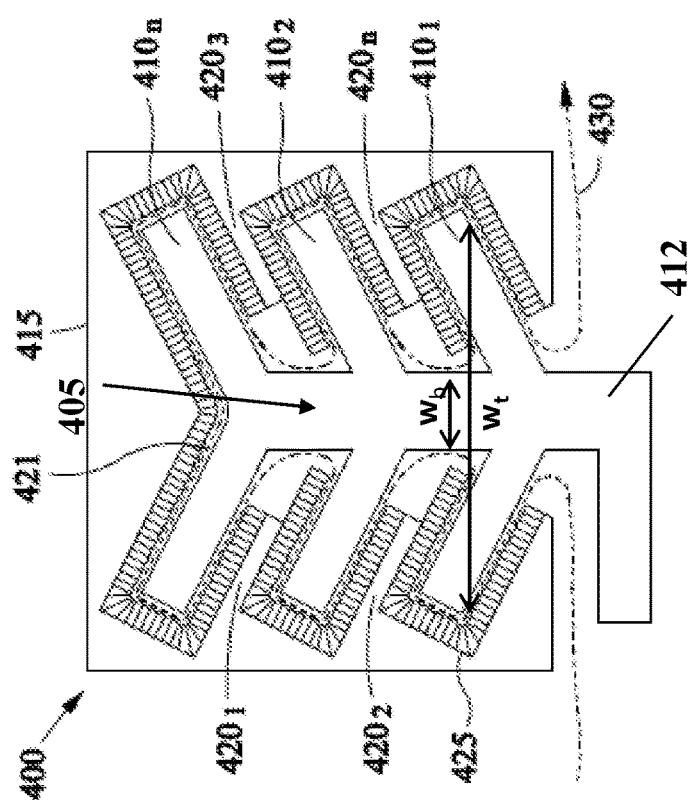
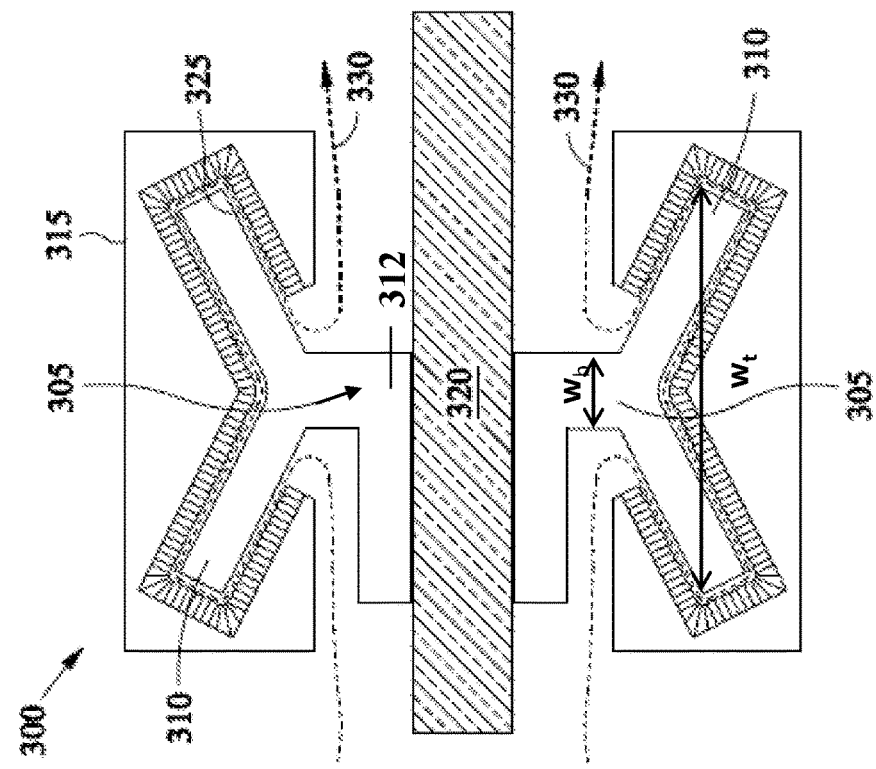

TIERED BRUSH SEAL

CROSS REFERENCE TO RELATED APPLICATIONS

This application claims the benefit of U.S. Provisional Patent Application No. 62/093,274 filed on Dec. 17, 2014, the entire contents of which are incorporated herein by reference thereto.

FIELD

The present disclosure relates to gas turbine engine sealing systems and, more particularly, to tiered brush seal structures.

BACKGROUND

Gas turbine engines may include sealing systems for one or more compartments. Conventional sealing systems are limited in the amount of pressure that can be handled. With the drive toward more efficient engines with higher bypass, smaller higher speed cores, and with higher pressures, there is a need for more efficient sealing within a smaller envelope. Accordingly, there is a need to provide components which minimize and/or limit package size and provide sealing with a gas turbine engine.

BRIEF SUMMARY OF THE EMBODIMENTS

Disclosed and claimed herein are sealing systems and structures. One embodiment is directed to a tiered brush seal structure for a gas turbine engine. The seal structure includes a circumferential structure including at least one tier, wherein the circumferential structure is configured to be coupled to a rotating component and a housing including brush elements engaged with the interior surfaces of the housing, wherein the housing is configured to enclose the circumferential structure, and wherein an airflow path is provided by the circumferential structure and the housing.

In one embodiment, the circumferential structure includes a plurality of tiers extending outwardly from a seal shoulder.

In one embodiment, each tier is vertically stacked relative to a seal shoulder.

In one embodiment, the at least one tier lengthens the air flow path relative to a rotating component.

In one embodiment, the brush elements of the housing extend perpendicularly from inner surfaces of the housing.

In one embodiment, the brush elements of the housing are swept from inner surfaces of the housing in a direction of rotation of the circumferential structure.

In one embodiment, the housing includes bristle walls extending from the inner surface of the housing into recesses formed by tiers of the circumferential structure.

In one embodiment, the at least one tier of the circumferential structure includes one or more v-shaped tiers.

In one embodiment, the circumferential structure includes a base width, $w_b$, less than a width of a tier, $w_t$, of the circumferential structure.

In one embodiment, an airflow path is formed between the at least one tier and brushes of the housing.

Another embodiment is directed to a tiered brush seal structure for a gas turbine engine. The tiered brush seal structure includes a circumferential structure including a plurality of tiers, wherein the circumferential structure is configured to be coupled to a rotating component. The tiered brush seal structure includes a housing including brush elements engaged with the interior surfaces of the housing, wherein the housing is configured to enclose the circumferential structure, and wherein an airflow path is provided by the circumferential structure and the housing.

In one embodiment, each tier is vertically stacked relative to a seal shoulder.

In one embodiment, the at least one tier lengthens the air flow path relative to a rotating component.

In one embodiment, the brush elements of the housing extend perpendicularly from inner surfaces of the housing.

In one embodiment, the brush elements of the housing are swept from inner surfaces of the housing in a direction of rotation of the circumferential structure.

In one embodiment, the housing includes bristle walls extending from the inner surface of the housing into recesses formed by tiers of the circumferential structure.

In one embodiment, the at least one tier of the circumferential structure includes one or more v-shaped tiers.

In one embodiment, the circumferential structure includes a base width, $w_b$, thicker less than a width of a tier, $w_t$, of the circumferential structure.

In one embodiment, an airflow path is formed between the at least one tier and brushes of the housing.

In one embodiment, a tiered brush seal structure for a gas turbine engine is provided. The seal structure having: a circumferential structure including at least one tier, wherein the circumferential structure is configured to be coupled to a rotating component; and a housing including brush elements engaged with the interior surfaces of the housing, wherein the housing is configured to enclose the circumferential structure, and wherein an airflow path is provided by the circumferential structure and the housing.

In addition to one or more of the features described above, or as an alternative to any of the foregoing embodiments, the circumferential structure includes a plurality of tiers extending outwardly from a seal shoulder.

In addition to one or more of the features described above, or as an alternative to any of the foregoing embodiments, each tier is vertically stacked relative to a seal shoulder.

In addition to one or more of the features described above, or as an alternative to any of the foregoing embodiments, the at least one tier lengthens the air flow path relative to a rotating component.

In addition to one or more of the features described above, or as an alternative to any of the foregoing embodiments, the brush elements of the housing extend perpendicularly from inner surfaces of the housing.

In addition to one or more of the features described above, or as an alternative to any of the foregoing embodiments, the brush elements of the housing are swept from inner surfaces of the housing in a direction of rotation of the circumferential structure.

In addition to one or more of the features described above, or as an alternative to any of the foregoing embodiments, the housing includes bristle walls extending from the inner surface of the housing into recesses formed by tiers of the circumferential structure.

In addition to one or more of the features described above, or as an alternative to any of the foregoing embodiments, the at least one tier of the circumferential structure includes one or more v-shaped tiers.

In addition to one or more of the features described above, or as an alternative to any of the foregoing embodiments, the circumferential structure includes a base width, $w_b$, thicker less than a width of a tier, $w_t$, of the circumferential structure.

In addition to one or more of the features described above, or as an alternative to any of the foregoing embodiments, further embodiments include an airflow path formed between the at least one tier and brushes of the housing.

In yet another embodiment, a tiered brush seal structure for a gas turbine engine is provided. The seal structure having: a circumferential structure including a plurality of tiers, wherein the circumferential structure is configured to be coupled to a rotating component; and a housing including brush elements engaged with the interior surfaces of the housing, wherein the housing is configured to enclose the circumferential structure, and wherein an airflow path is provided by the circumferential structure and the housing.

In addition to one or more of the features described above, or as an alternative to any of the foregoing embodiments, and in further embodiments each tier is vertically stacked relative to a seal shoulder.

In addition to one or more of the features described above, or as an alternative to any of the foregoing embodiments, the at least one tier lengthens the air flow path relative to a rotating component.

In addition to one or more of the features described above, or as an alternative to any of the foregoing embodiments, the brush elements of the housing extend perpendicularly from inner surfaces of the housing.

In addition to one or more of the features described above, or as an alternative to any of the foregoing embodiments, the brush elements of the housing are swept from inner surfaces of the housing in a direction of rotation of the circumferential structure.

In addition to one or more of the features described above, or as an alternative to any of the foregoing embodiments, the housing includes bristle walls extending from the inner surface of the housing into recesses formed by tiers of the circumferential structure.

In addition to one or more of the features described above, or as an alternative to any of the foregoing embodiments, the at least one tier of the circumferential structure includes one or more v-shaped tiers.

In addition to one or more of the features described above, or as an alternative to any of the foregoing embodiments, the circumferential structure includes a base width, $w_b$, thicker less than a width of a tier, $w_t$, of the circumferential structure.

In addition to one or more of the features described above, or as an alternative to any of the foregoing embodiments, further embodiment include an airflow path formed between the at least one tier and brushes of the housing.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 3 depicts a graphical representation of a tiered seal support structure according to one or more other embodiments;

FIG. 4 depicts a graphical representation of a tiered seal support structure according to one or more other embodiments.

DETAILED DESCRIPTION OF THE EXEMPLARY EMBODIMENTS

Overview and Terminology

One aspect of the disclosure relates to a sealing system for a gas turbine engine. In one embodiment, a seal structure is provided including one or more tiers and a housing configured to retain brush elements mounted to the inner surfaces/walls of the housing. One or more tiers may be provided in the seal structure to lengthen the air path and provide multiple brush seals within the same package. The sealing structure may be used in one or more compartments or systems of a gas turbine engine.

As used herein, a tier may relate to a portion of a seal structure which extends out from a circumferential structure. The circumferential structure of a seal may include multiple tiers. Each tier may be associated with elements of a housing and/or elements of a circumferential structure.

According to one or more embodiments, a seal structure may include brush elements retained to a housing. The brush elements may be bristles or other elements that extend from the housing. Brush elements may be contact or non-contact with respect to a circumferential structure of a seal (e.g., rotating component). In certain embodiments brush elements may extend perpendicularly from surfaces of the housing. In other embodiments, brush elements may be swept or extend angularly from inner surfaces of the housing, such that the bristles are swept in the direction a circumferential structure of a seal rotates.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
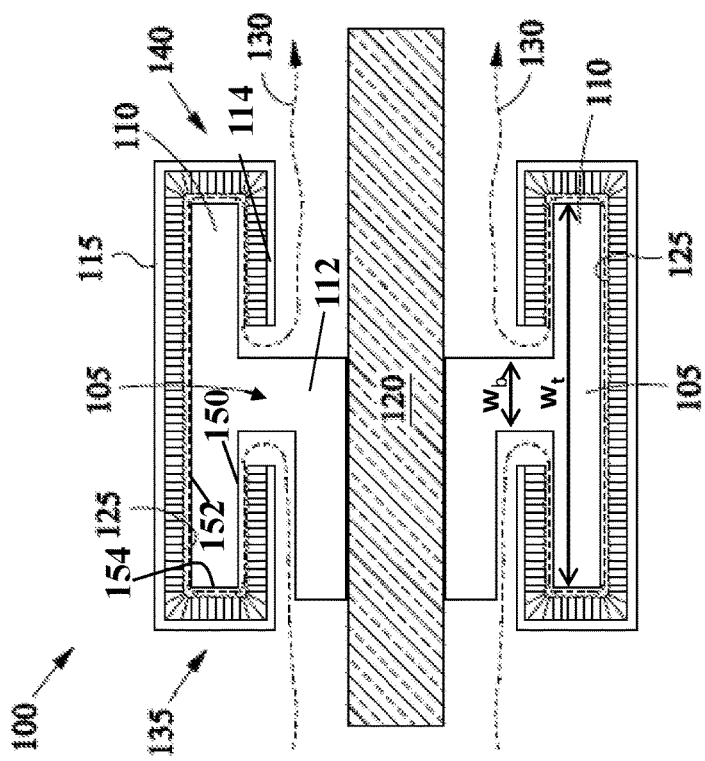
FIG. 1 depicts a cross-sectional representation of a tiered seal support structure according to one or more embodiments.

FIG. 1 depicts a cross-sectional representation of a seal structure for a gas turbine engine according to one or more embodiments. According to one embodiment, seal structure 100 is a circumferential seal structures. Seal structure 100 includes a tiered seal support structure having a circumferential structure 105 and tier shown as 110. The tier 110 extends from a base 112 of the circumferential structure 105 and is disposed substantially perpendicular to the base 112. The base 112 has a width, $w_b$, that is less than a width, $w_t$, of the tier 110. In addition seal 100 includes housing 115 having a plurality of elements 114. The plurality of elements 114 extend towards the circumferential structure 105. At least one element of the plurality of elements 114 extends between the tier 110 and the base 112. Portions of the plurality of elements 114 are disposed generally parallel to a rotating object 120. Seal 100 is shown relative to the rotating object 120. Seal housing 115 and seal structure formed by circumferential structure 105 and tier 110 allow for the airflow path 130 relative to the entry point and exit of seal 100 to be lengthened. In that fashion, seal 100 may act as a pressure seal relative to a high pressure side 135 and a low pressure side 140.

According to one embodiment, tiers, such as tier 110 can lengthen the air flow path 130 relative to a rotating component 120. By way of example, tier 110 and/or housing 115 cause air flow path 130 to be redirected within the housing such that the air flow follows the surfaces of tier 110 and housing 115.

Housing 115 includes brush elements 125 mounted and/or fixed to the interior surfaces of the housing 115. The brush elements 125 may be mounted and/or fixed to the inner surface of the plurality of elements 114. Housing 115 may be configured to enclose the circumferential structure 105 and allow for air flow relative to the circumferential structure 105 and housing 115. In certain embodiments, housing 115 may be a multi-piece housing to allow for assembly. According to one or more embodiments, housing 115 may include one or more components as a full ring. Alternatively, housing 115 may be a segmented ring. By way of example, housing 115 may include a full ring, or segmented ring for high pressure side 135 and a full ring, or segmented ring, for low pressure side 140.

Brush elements 125, which may include bristles, of the housing 115 extend from inner surfaces of the housing 115 and may engage with surfaces of circumferential structure 105. In certain embodiments, brush elements 125, may extend perpendicularly from the surface of housing 115. In other embodiments, brush elements 125 of the housing can extend angularly from inner surfaces of the housing 115, such that the bristles are offset in a direction associated with rotation of circumferential structure 105. The brush elements 125 are disposed about an underside 150, a top side 152, and a tip 154 that extends between the underside 150 and the top side 152 of the tier 110.

Figure 2:
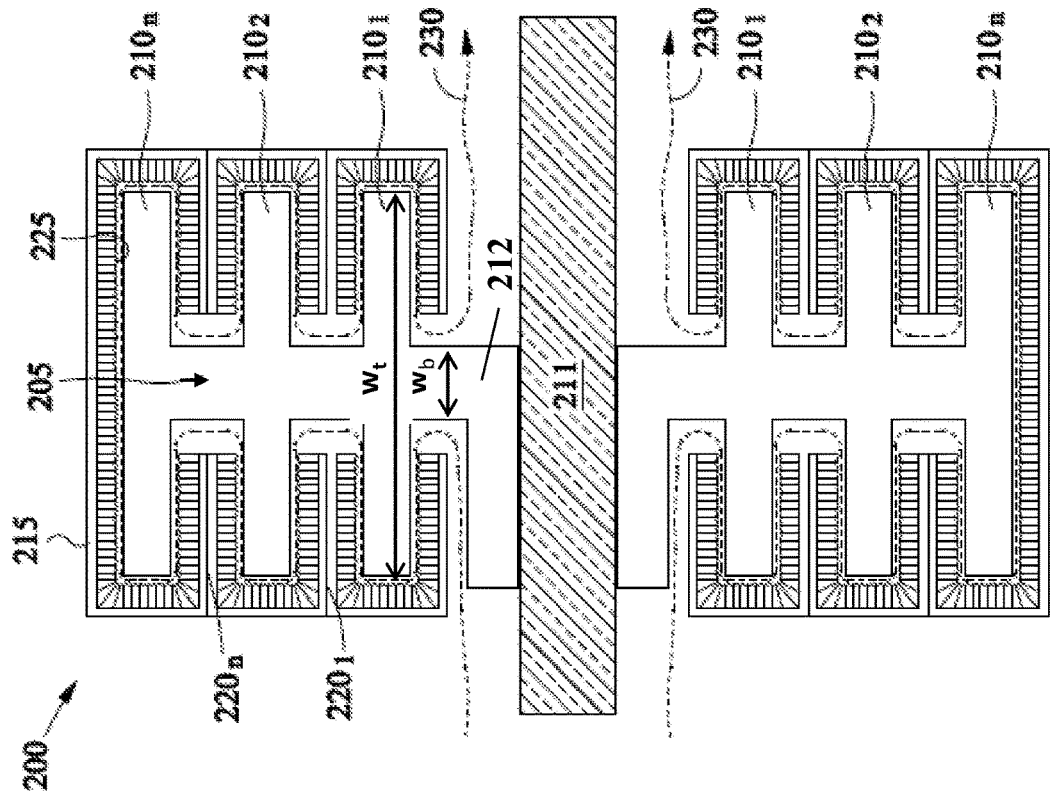
FIG. 2 depicts a graphical representation of a tiered seal support structure according to one or more other embodiments.

FIG. 2 depicts a tiered seal according to another embodiment. Seal 200 includes circumferential structure 205 and a plurality of tier elements $210_{1-n}$ for seal 200. The plurality of tier elements $210_{1-n}$ extend radially outwardly from a base 212 of the circumferential structure 205. The base 212 has a width, $w_b$, that is less than a width, $w_t$, of the tier 210. In addition, seal 200 includes housing 215 having a plurality of elements. Seal 200 is shown relative to a rotating object 211. Seal housing 215, circumferential structure 205 and tiers elements $210_{1-n}$ allow for the airflow path 230 relative to the entry point and exit of seal 200 to be lengthened. Seal 200 may act as a pressure seal between a high pressure side and a low pressure side of the seal.

The housing 215 includes brush elements 225 extending from the inner surfaces of the housing into recesses formed by tier elements $220_{1-n}$ of the circumferential structure. Airflow path 230 is formed between the tier elements $210_{1-n}$ of circumferential structure 205 and brush elements 225 of the housing 215.

FIG. 3 depicts a graphical representation of a tiered seal support structure according to one or more other embodiments. According to one embodiment, a tiered brush seal structure includes one or more v-shaped tiers. Seal 300 includes circumferential structure 305 and a plurality of tiers $310_{1-n}$ for seal 300. The plurality of tiers $310_{1-n}$ extend from a base 312 of the circumferential structure 305 and are disposed in a non-perpendicular relationship with the base 312. The plurality of tiers $310_{1-n}$ are angled away from a rotating object 320 such that a distal end of a tier of the plurality of tiers $310_{1-n}$ is disposed further from the rotating object 320 than a proximal end of the tier of the plurality of tiers $310_{1-n}$. The plurality $310_{1-n}$ are vertically stacked relative to each other. In addition, seal 300 includes housing 315. Seal 300 is shown relative to the rotating object 320. Airflow path 330 is formed between the tier of circumferential structure 305 and brush elements 325 of the housing 315.

Seal housing 315 and seal structure formed by circumferential structure 305 and tier 310 allow for the airflow path 330 relative to the entry point and exit of seal 300 to be lengthened. In that fashion, seal 300 may act as a pressure seal between a high pressure side and a low pressure side, the low pressure side indicated by the exit point of airflow path 330.

FIG. 4 depicts a graphical representation of a tiered seal support structure according to one or more other embodiments seal 400 includes a circumferential structure 405 and a plurality of tiers $410_{1-n}$ for seal 400. The plurality of tiers $410_{1-n}$ extend from a base 412 of the circumferential structure 405 and are disposed in a non-perpendicular relationship with the base 412. In addition, seal 400 includes housing 415 having a plurality of elements. Seal housing 415 and the seal structure formed by circumferential structure 405 and tiers $410_{1-n}$ allow for the airflow path 430 relative to the entry point and exit of seal 400 to be lengthened. In that fashion, seal 400 may act as a pressure seal between a high pressure side and a low pressure side, the low pressure side indicated by the exit point of airflow path 430.

Housing 415 includes a plurality of tier elements $420_{1-n}$ which project into the housing between spaces of tiers $410_{1-n}$ of circumferential structure 405. Housing 415 may optionally include a protrusion or surface, shown as 421, which extend from the housing to match the contours of tier elements $420_{1-n}$. In FIG. 4, tiers $410_{1-n}$ of circumferential structure 405 are angled up at the tips of tiers $410_{1-n}$ and tier elements $420_{1-n}$ are angled down. According to another embodiment, the size and spacing of circumferential structure 405 may vary or change based on a tier level. By way of example, tiers $410_{1-n}$ of circumferential structure 405 may reduce or increase in size as the tier is positioned further from a rotating component.

With respect to the embodiments depicts in FIGS. 3 and 4, it should be appreciated that other arrangements for a seal structure may be provided such that tiers $410_{1-n}$ of circumferential structure 405 are angled down at the tips of tiers $410_{1-n}$ and tier elements $420_{1-n}$ are angled up.

Figure 5B:
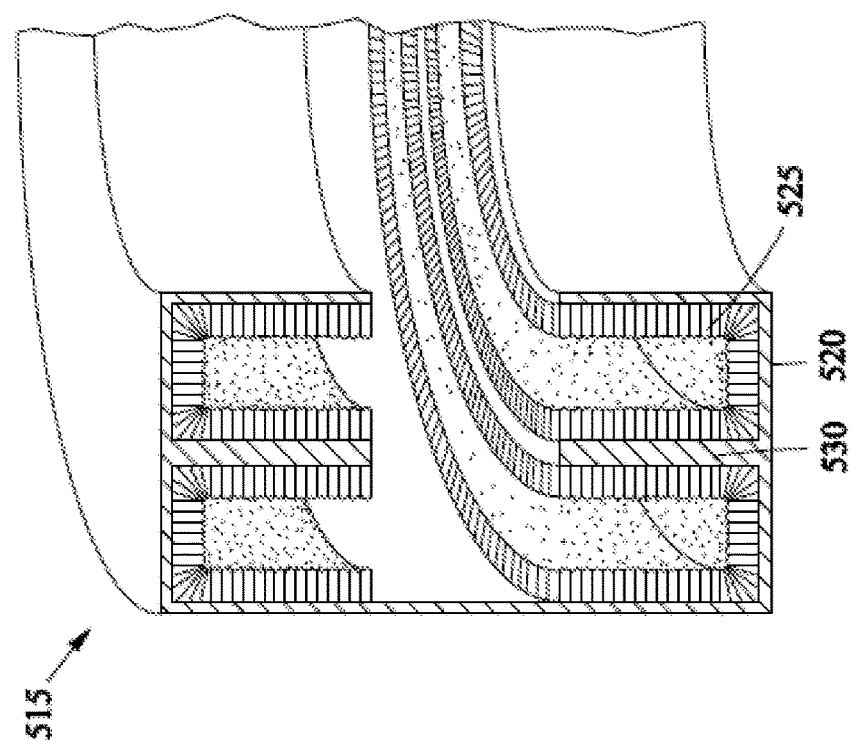
FIGS. 5A-5B depict graphical representations of a tiered seal support according to one or more embodiments.
Figure 5A:
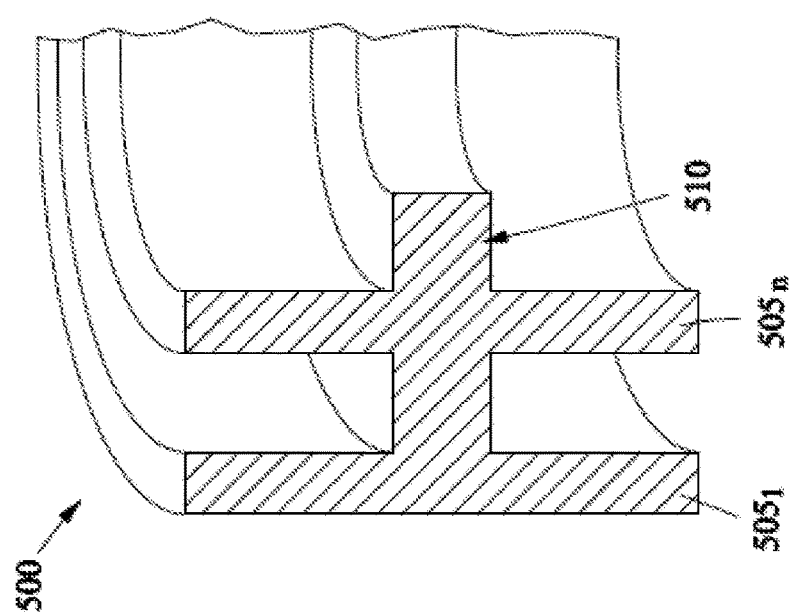

FIGS. 5A-5B depict graphical representations of a tiered seal support according to one or more embodiments. Seal structure 500 is a three dimensional representation of a tiered support structure (e.g., two tier version of circumferential structure 105). Seal structure 500 is depicted as a portion of a circumferential structure. Seal structure 500 includes a plurality of tiers $505_{1-n}$. FIG. 5B depicts a housing 515 for seal structure 500 having brush elements 525 along inner surfaces of a plurality of elements 530. Housing 515 is depicted as a portion of a housing (e.g., two tier version of housing 115).

While this disclosure has been particularly shown and described with references to exemplary embodiments thereof, it will be understood by those skilled in the art that various changes in form and details may be made therein without departing from the scope of the claimed embodiments.

What is claimed is:

1. A tiered brush seal structure for a gas turbine engine, the seal structure comprising:
   a circumferential structure including a plurality of tiers extending directly from a base, wherein the circumferential structure is configured to be coupled to a rotating component; and
   a housing including brush elements engaged with interior surfaces of the housing, the brush elements being disposed about and spaced apart from an underside, a top side, and a tip that extends between the underside and the top side of at least one tier of the plurality of tiers, the housing is configured to enclose the circumferential structure, and wherein an airflow path is provided by the circumferential structure and the housing.

2. The tiered brush seal structure of claim 1, wherein the plurality of tiers extend outwardly from the base.

3. The tiered brush seal structure of claim 1, wherein the brush elements of the housing extend perpendicularly from interior surfaces of the housing.

4. The tiered brush seal structure of claim 1, wherein the brush elements of the housing are swept from interior surfaces of the housing in a direction of rotation of the circumferential structure.

5. The tiered brush seal structure of claim 1, wherein the brush elements includes bristles extending from interior surfaces of the housing into recesses formed by tiers of the circumferential structure.

6. The tiered brush seal structure of claim 1, wherein the plurality of tiers of the circumferential structure include one or more v-shaped tiers.

7. The tiered brush seal structure of claim 1, wherein the base has a width that is less than a width of each tier.

8. The tiered brush seal structure of claim 1, wherein an airflow path is formed between the plurality of tiers and brushes of the housing.

9. A tiered brush seal structure for a gas turbine engine, the seal structure comprising:
   a circumferential structure including a base and a plurality of tiers extending from the base and are disposed in a non-perpendicular relationship with the base, wherein the circumferential structure is configured to be coupled to a rotating component; and
   a housing including brush elements engaged with interior surfaces of the housing and a plurality of tier elements that project into the housing between spaces defined between tiers of the plurality of tiers, wherein the housing is configured to enclose the circumferential structure, and wherein an airflow path is provided by the circumferential structure and the housing.

10. The tiered brush seal structure of claim 9, wherein each tier is vertically stacked relative to each other.

11. The tiered brush seal structure of claim 9, wherein the plurality of tiers redirect the air flow path within the housing such that the air flow path follows the surfaces of the plurality of tiers and interior surfaces of the housing.

12. The tiered brush seal structure of claim 9, wherein the brush elements of the housing extend perpendicularly from interior surfaces of the housing.

13. The tiered brush seal structure of claim 9, wherein the brush elements of the housing are swept from interior surfaces of the housing in a direction of rotation of the circumferential structure.

14. The tiered brush seal structure of claim 9, wherein the brush elements include bristles extending from the interior surface of the housing into recesses formed by the plurality of tiers of the circumferential structure.

15. The tiered brush seal structure of claim 9, wherein the plurality of tiers of the circumferential structure includes one or more v-shaped tiers.

16. The tiered brush seal structure of claim 9, wherein the base has a width that is less than width of the plurality of tiers.

17. The tiered brush seal structure of claim 9, wherein an airflow path is formed between the plurality of tiers and brush elements.

* * * * *